United States Patent
Fujii et al.

(10) Patent No.: US 12,420,733 B2
(45) Date of Patent: Sep. 23, 2025

(54) VEHICLE FRONT STRUCTURE

(71) Applicant: HONDA MOTOR CO., LTD., Tokyo (JP)

(72) Inventors: Momoka Fujii, Tokyo (JP); Nobuyuki Tsuichihara, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 394 days.

(21) Appl. No.: 18/191,154

(22) Filed: Mar. 28, 2023

(65) Prior Publication Data

US 2023/0311800 A1 Oct. 5, 2023

(30) Foreign Application Priority Data

Mar. 30, 2022 (JP) .................. 2022-056632

(51) Int. Cl.
*B60R 19/52* (2006.01)
*B60K 11/08* (2006.01)
*G01S 13/931* (2020.01)

(52) U.S. Cl.
CPC .............. *B60R 19/52* (2013.01); *B60K 11/08* (2013.01); *B60R 2019/527* (2013.01); *G01S 2013/93271* (2020.01)

(58) Field of Classification Search
CPC . B60R 19/52; B60R 2019/527; B60R 19/483; B60R 2019/525; B60K 11/08; G01S 2013/93271
USPC .................................. 296/193.1; 293/4, 115
See application file for complete search history.

(56) References Cited

U.S. PATENT DOCUMENTS

| | | | | |
|---|---|---|---|---|
| 9,682,728 | B2* | 6/2017 | Taneda | B62D 25/085 |
| 9,840,144 | B2* | 12/2017 | Aizawa | B60R 19/023 |
| 11,203,313 | B2* | 12/2021 | Momii | G01S 13/931 |
| 11,433,834 | B2* | 9/2022 | Novoa Liceaga | B60R 19/483 |
| 2011/0001325 | A1 | 1/2011 | Bernt et al. | |
| 2017/0050509 | A1 | 2/2017 | Aizawa et al. | |
| 2025/0178543 | A1* | 6/2025 | Hernandez | B60R 11/04 |

FOREIGN PATENT DOCUMENTS

| | | | | |
|---|---|---|---|---|
| DE | 102015119269 A1 | * | 5/2016 | ........... B62D 25/085 |
| EP | 4523970 A1 | * | 3/2025 | ........... B62D 25/085 |
| JP | 2007-216927 A | | 8/2007 | |
| JP | 2017-39366 A | | 2/2017 | |
| JP | 2018039335 A | * | 3/2018 | |
| JP | 2020-6879 A | | 1/2020 | |

OTHER PUBLICATIONS

Machine Translation of DE-102015119269-A1, Jun. 13, 2025.*

(Continued)

*Primary Examiner* — Jason S Morrow
(74) *Attorney, Agent, or Firm* — Rankin, Hill & Clark LLP

(57) ABSTRACT

A vehicle front structure includes: an air guide member arranged behind an opening of a front bumper to guide rearward ambient air taken through the opening; a radar attached to an upper front grille; and a grille support member arranged behind the radar and extending substantially horizontally in a vehicle front-rear direction, wherein a front end of the grille support member is fixed to the upper front grille, and a rear end of the grille support member is fixed to the air guide member.

8 Claims, 7 Drawing Sheets

(56) References Cited

OTHER PUBLICATIONS

Machine Translation of JP-2018039335-A, Jun. 13, 2025.*
Machine Translation of EP-4523970-A1, Jun. 13, 2025.*
Machine Translation of JP-2020006879-A, Jun. 13, 2025.*
Japanese Office Action received in corresponding Japanese application No. 2022-056632 dated Oct. 17, 2023 with English translation (6 pages).

* cited by examiner

VEHICLE FRONT STRUCTURE

CROSS-REFERENCE TO RELATED APPLICATION

This application claims the benefit of priority to Japanese Patent Application No. 2022-056632 filed on Mar. 30, 2022, the disclosures of all of which are hereby incorporated by reference in their entireties.

TECHNICAL FIELD

The present invention relates to a vehicle front structure.

BACKGROUND OF THE INVENTION

Efforts have been made in recent years to provide access to sustainable transportation systems friendly to vulnerable transportation participants, such as elderly and children. To this end, efforts in research and development have been focused on further improving safety and convenience in transportation through developments related to improving collision safety performance of a vehicle body. A conventional vehicle front structure has been known to have a grille support member supporting a front grille, at a front of a vehicle body, from behind in the center in a vehicle width direction of the front grille (see Japanese Patent Application Publication No. 2007-216927 A, hereinbelow referred to as Patent Document 1, for example). In particular, the grille support member has a rear end thereof fixed to a lower end of a center stay extending from a frame-like shroud panel provided in front of a radiator to a bumper beam. The grille support member supports a center portion in the vehicle width direction of the front grille, by a front end thereof extending diagonally upward from a portion thereof fixed to the center stay. According to the vehicle front structure having such a grille support member, the grille support member prevents the center portion in the vehicle width direction of the front grille from sagging under a dead weight of the front grille.

SUMMARY

Problems to be Solved

From another aspect of a conventional vehicle front structure (see Patent Document 1, for example), in the event of a vehicle colliding with a pedestrian at a front thereof, a collision load is often transmitted rearward and downward from the front grille. However, the grille support member of the conventional vehicle front structure is configured to prop up the collision load at a position between the front grille and the lower end of the center stay coupled to the bumper beam, as described above. Accordingly, the conventional front structure may have a risk of failing to efficiently absorb the load inputted in the event of a collision with a pedestrian. In addition, the front grille of the conventional vehicle front structure (see Patent Document 1, for example) is supported by the grille support member leaning rearward and downward, to potentially bow rearward due to wind pressure while the vehicle is traveling. Accordingly, the conventional vehicle front structure, when having a radar on the front grille to detect obstacles, would have difficulty to guarantee performance of the radar because of the front grille bowing due to wind pressure.

The present invention is thus intended to provide a vehicle front structure to improve collision safety performance for a pedestrian and prevent a front grille from deformation due to wind pressure while a vehicle is traveling, as comparted with a conventional one. The invention furthermore contributes to fostering sustainable transportation systems.

Solution to Problem

A vehicle front structure of the present invention to solve the above-identified problem includes: a front bumper having an opening; a front grille attached to the front bumper; an air guide member arranged behind the opening of the front bumper to guide rearward ambient air taken through the opening; a radar attached to the front grille; and a grille support member arranged behind the radar and extending substantially horizontally in a vehicle front-rear direction, wherein a front end of the grille support member is fixed to the front grille directly or indirectly via the radar, and a rear end of the grille support member is fixed to the air guide member.

Advantageous Effects of the Invention

The present invention provides a vehicle front structure to improve collision safety performance for a pedestrian and prevent a front grille from deformation due to wind pressure while a vehicle is traveling or change in ambient temperature, as comparted with a conventional one.

DETAILED DESCRIPTION

Figure 1:
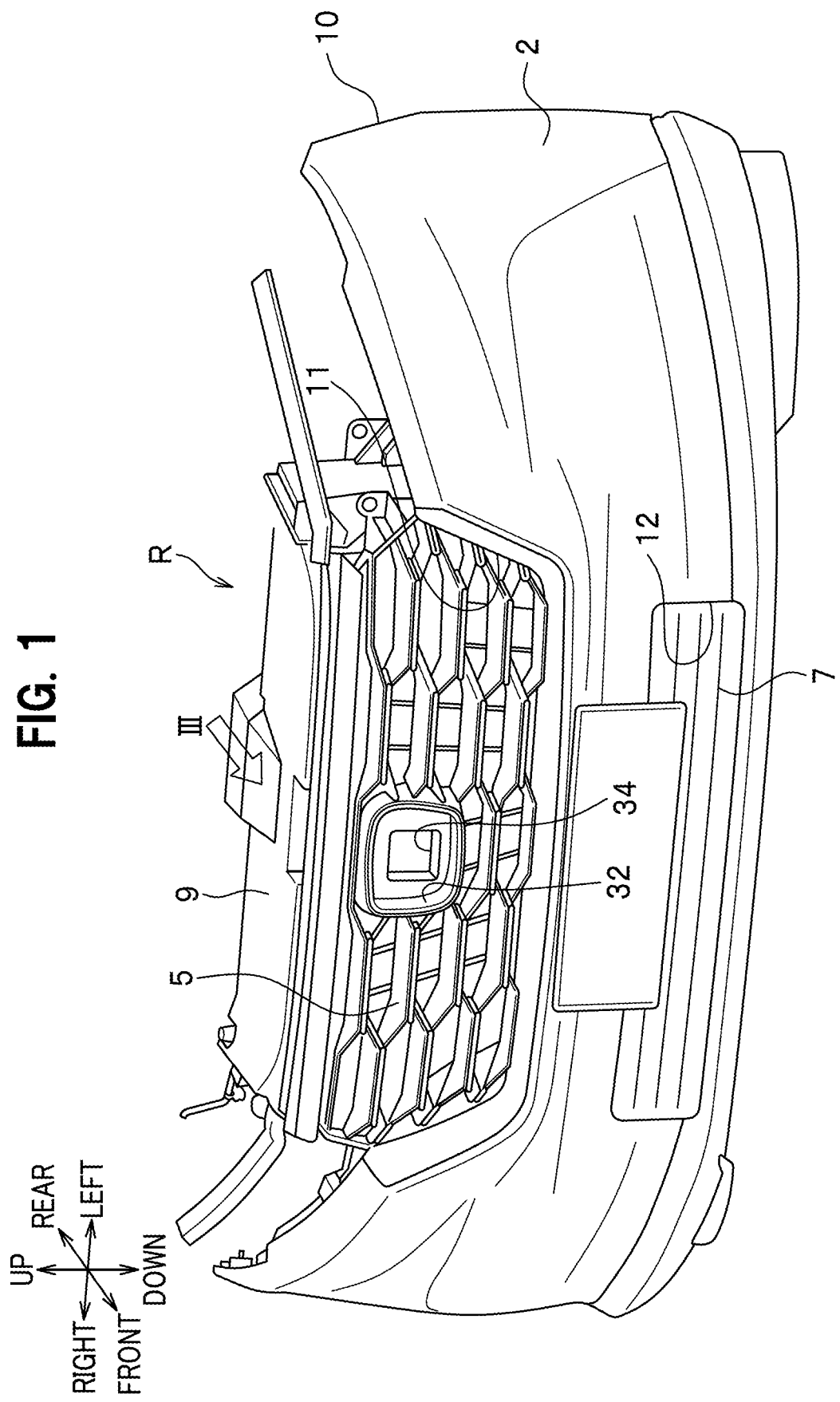
FIG. 1 is a partially enlarged perspective view of a vehicle body including a vehicle front structure according to an embodiment.

Next, a description is given in detail of an embodiment of a vehicle front structure of the present invention, with reference to the drawings as required. Note that arrowed directions of front, rear, up, down, right, and left in the drawings are matched to directions of a vehicle. In the description, a right-left direction of the vehicle may be referred to as a vehicle width direction. Hereinafter, a vehicle body having the vehicle front structure is first described and the vehicle front structure is then described in detail.

<<Configuration of Vehicle Body>>

FIG. 1 is a partially enlarged perspective view of a vehicle body 10 including the vehicle front structure according to the embodiment. FIG. 1 shows the vehicle body 10, with a front hood and front lights removed. As shown in FIG. 1, the vehicle body 10 of the embodiment is provided, at a front thereof, with a power unit room R to house a driving electric motor and/or an internal combustion engine, which is/are not shown. The power unit room R is covered from above by a front hood (not shown) which can be opened and closed.

The vehicle body 10 is provided at a front thereof with a front bumper (front bumper face) 2 extending in a right-left direction. The front bumper 2 is formed with an upper opening 11 and a lower opening 12. Note that the upper opening 11 of the upper and lower openings 11, 12 corresponds to "an opening of the front bumper" in one or more claims.

The upper opening 11 of the embodiment is formed by a center portion in the vehicle width direction of the front bumper 2 being cut off so as to be concave downward, in a front view of the vehicle. The upper opening 11 has an upper front grille 5 in a reticular pattern attached thereto. The upper front grille 5 corresponds to "a front grille" in one or more claims.

The upper front grille 5 of the embodiment is formed to have a honeycomb shape. The upper front grille 5 is formed, at a center portion in the vehicle width direction thereof, with an emblem mount 32 mounted with an emblem (not shown). The emblem mount 32 is formed, at a center thereof, with a radar storage 34 in a frame shape. The radar storage 34 stores a radar 8 (see FIG. 2), to be described below, from behind the upper front grille 5. This causes the radar 8 to be positioned right behind the emblem (not shown). Note that an upper portion of the upper front grille 5 extends higher than the upper opening 11. The front lights (not shown) are arranged on outer sides in the vehicle width direction of the extended upper portion of the upper front grille 5.

The lower opening 12 is formed in the front bumper 2 so as to be positioned below a bumper beam (not shown). The lower opening 12 of the embodiment has a rectangular shape elongated in the vehicle width direction, in a front view of the vehicle. The lower opening 12 is mounted with a lower front grille 7 reticulated in a honeycomb pattern. Note that a reference sign 9 in FIG. 1 indicates a cover member elongated in the vehicle width direction. The cover member 9 is arranged between an upper member, as a frame member 6a (see FIG. 2) of a grille shutter 6 (see FIG. 2) to be described below, and a front rim of an opening of the power unit room R, and covers from above an air guide member 4 (see FIG. 2) to be described below.

Figure 2:
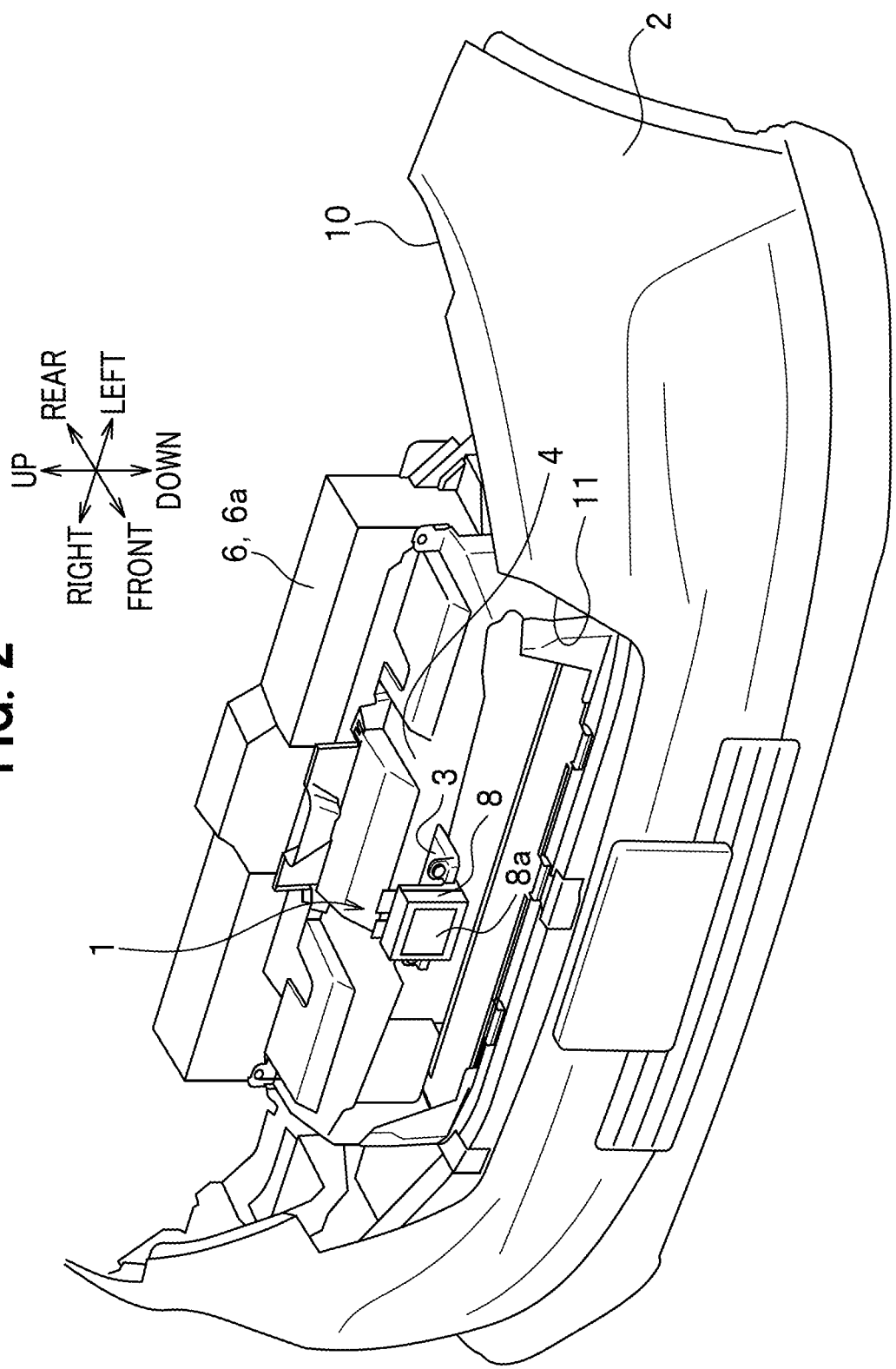
FIG. 2 is a partially enlarged perspective view of a vehicle front, with a front grille removed.
Figure 3:
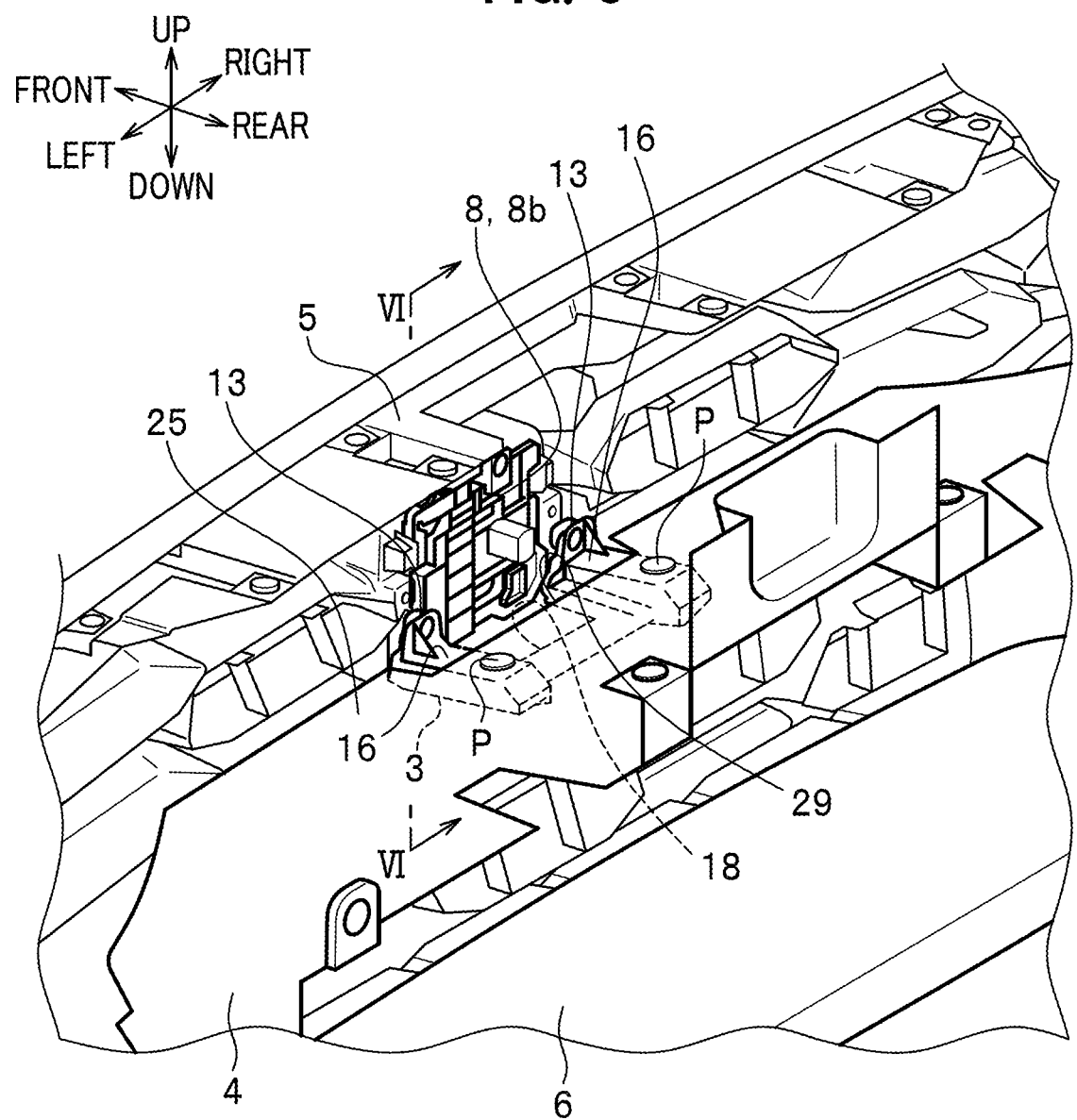
FIG. 3 is a partially enlarged perspective view of a back side of the front grille, as viewed from a direction indicated by an arrow III in FIG. 1.

FIG. 2 is a partially enlarged perspective view of a vehicle front, with the cover member 9 (see FIG. 1) removed as well as the front upper grille 5 (see FIG. 1) removed, leaving the radar 8 in the vehicle body 10. FIG. 3 is a partially enlarged perspective view of a back side of the upper front grille 5, as viewed from a direction indicated by an arrow III in FIG. 1, with the cover member 9 in FIG. 1 removed.

As shown in FIG. 2, the vehicle body 10 includes, in order from front to rear, the radar 8 attached to the upper front grille 5 (see FIG. 1), a grille support member 3, the air guide member 4, and the grille shutter 6. Additionally, an assembly of a front bulkhead and a cooling device, inclusive of a radiator, is arranged behind the grille shutter 6, even though not shown.

The radar 8 in FIG. 2 is shown as separated from the upper front grille 5 (see FIG. 1) for the purpose of illustration, and is actually stored in the radar storage 34 in FIG. 1. The radar 8 includes a sensor 8a to detect obstacles in front of the vehicle. The sensor 8a includes a radar body 8a1 (see FIG. 6) having a high-frequency circuit, antenna, and the like housed in a case, even though not shown, and a connector 8a2 (see FIG. 6) connected by a harness H (see FIG. 6), to be described below, composed of power-line wires, signal lines, and the like. The radar 8 also has a support board 8b in a grid pattern to be attached to a back surface of the sensor 8a (see FIG. 2), as shown in FIG. 3. The sensor 8a (see FIG. 2) is fixed by a fastener, such as a bolt, to a back surface of the upper front grille 5 via the support board 8b.

The grille support member 3 in FIG. 3 is a member to connect the back surface of the upper front grille 5 with the air guide member 4. The grille support member 3 and the air guide member 4 are described below in detail.

As shown in FIG. 2, the grille shutter 6 is arranged behind the upper opening 11, in which the upper front grille 5 (see FIG. 1) is attached, and in front of the radiator (not shown). The grille shutter 6 of the embodiment is assumed to have the frame member 6a (see FIG. 2) fixed to the front bulkhead (not shown), and a shutter body (not shown) supported by the frame member 6a. The grille shutter 6 is controlled to supply or block onrushing air from forward travel, guided rearward by the air guide member 4 in a duct shape from the upper opening 11 in which the upper front grille 5 (see FIG. 1) is attached, to the radiator at a predetermined timing tailored to the needs.

<<Vehicle Front Structure>>

Next, the vehicle front structure of the embodiment is described. As shown in FIG. 2, a vehicle front structure 1 of the embodiment mainly includes the grille support member 3 behind the radar 8, and the air guide member 4 to which a rear end of the grille support member 3 is fixed.

Figure 4:
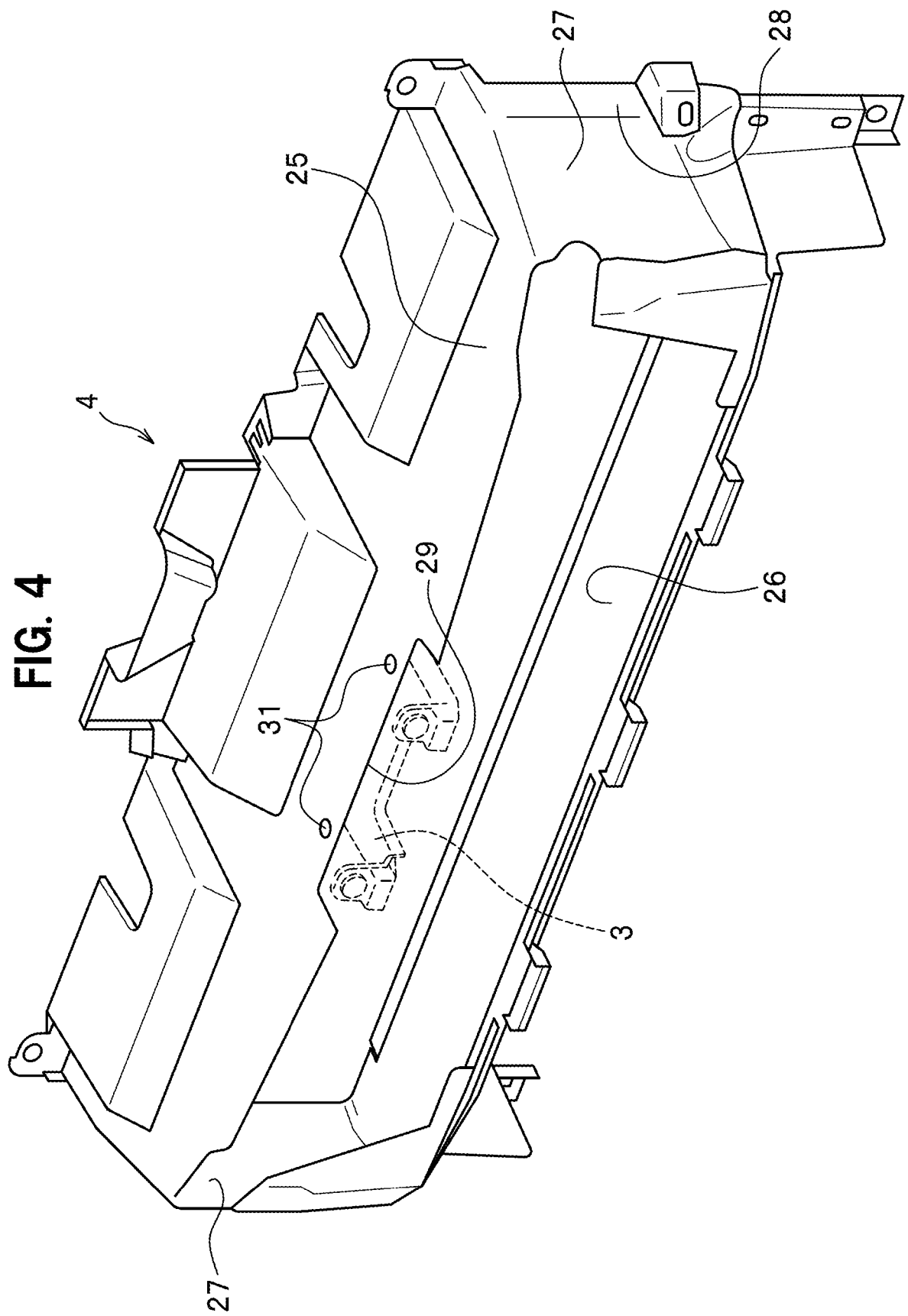
FIG. 4 is an overall perspective view of an air guide member of the vehicle front structure according to the embodiment.

FIG. 4 is an overall perspective view of the air guide member 4. Note that the grille support member 3 attached to the air guide member 4 is indicated by an imaginary line (dotted line) in FIG. 4. First described is the air guide member 4. The air guide member 4 is formed of a duct shape composed of a polygonal tubular body having a rectangular shape in cross-section, as shown in FIG. 4. In particular, the air guide member 4 includes an upper air-flow smoother plate 25, a lower air-flow smoother plate 26, and a pair of side plates 27 connecting both edges in the vehicle width direction of the upper air-flow smoother plate 25 and lower air-flow smoother plate 26 with each other.

A rear opening of the air guide member 4 is arranged to face a front opening of the frame member 6a of the grille shutter 6 in FIG. 2. The air guide member 4 is then connected to the frame member 6a (see FIG. 2) via attachment ribs 28 formed at both sides thereof in the vehicle width direction and extending in an up-down direction. Additionally, the air guide member 4 has a front edge of the lower air-flow smoother plate 26 supported by an upper surface of the bumper beam, even though not shown.

As shown in FIG. 3, the upper air-flow smoother plate 25 of the air guide member 4 extends forward from a rear end thereof adjacent to the grille shutter 6 and is provided, at a front edge thereof, with an attachment portion 29 for the grille support member 3. Incidentally, the attachment portion 29 of the grille support member 3 of the embodiment is provided at a portion of the upper air-flow smoother plate 25, having a center portion in the vehicle width direction of a front edge thereof cut off so as to be partially receded. Note that a reference sign P in FIG. 3 indicates a joining pin for attaching the grille support member 3 to be described below. As shown in FIG. 4, the grille support member 3 is formed, in the attachment portion 29 thereof, with insertion holes 31 at positions corresponding to the joining pins P (see FIG. 3). The air guide member 4 of the embodiment is assumed to be made of a flexible resin, an elastic body such as synthetic rubber, or the like. Particularly preferable among these is the air guide member 4 made of resin.

Figure 5A:
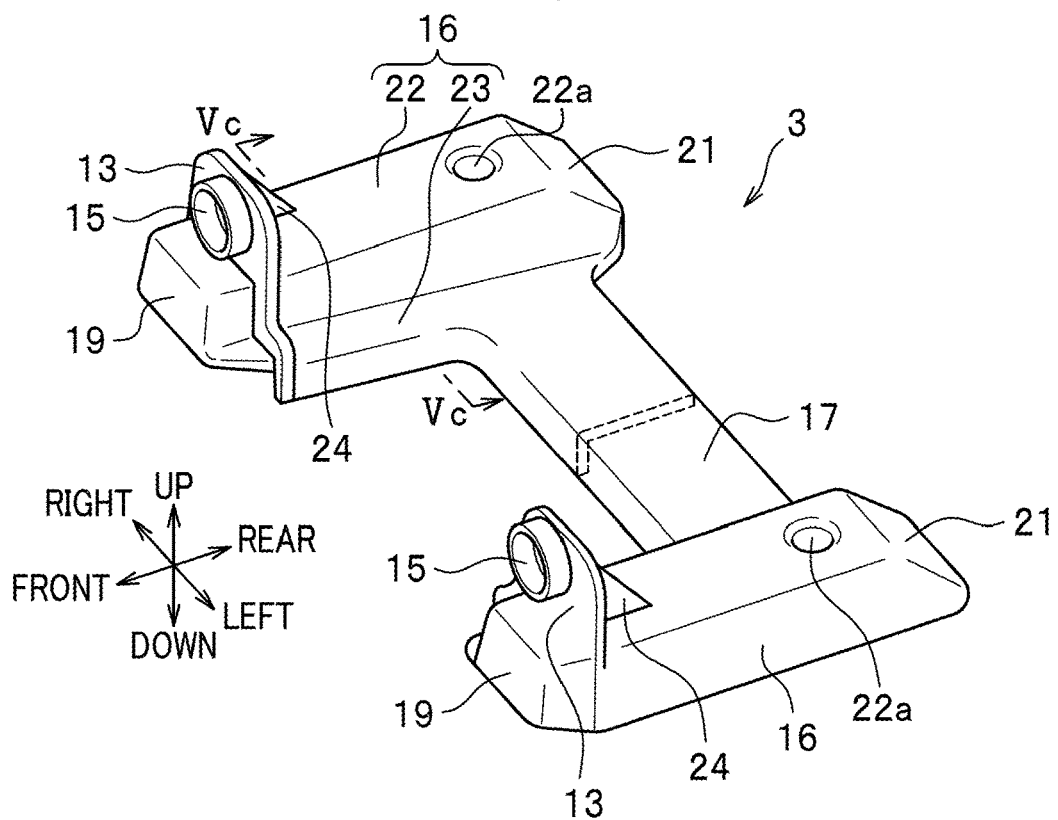
FIG. 5A is an overall perspective view of a grille support member, as viewed from above, diagonally forward left.
Figure 5B:
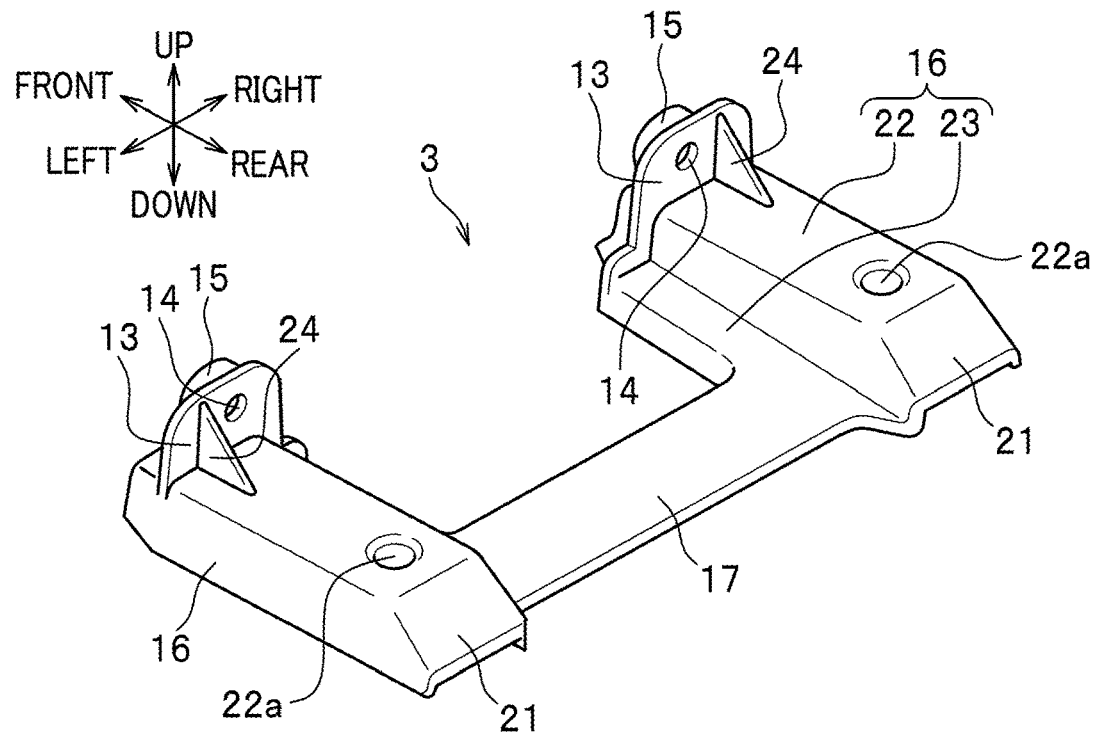
FIG. 5B is an overall perspective view of the grille support member, as viewed from above, diagonally rearward left.
Figure 5C:
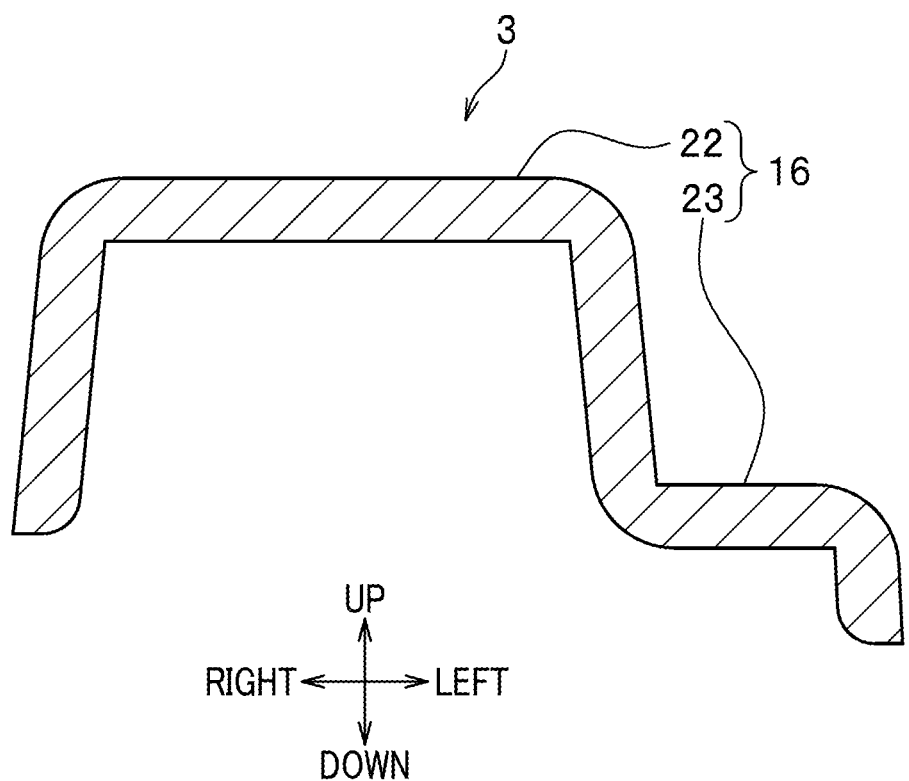
FIG. 5C is a cross-sectional view of a scene in FIG. 5A, taken along a line Vc-Vc.

Next described is the grille support member 3. FIG. 5A is an overall perspective view of the grille support member 3, as viewed from above, diagonally forward left. FIG. 5B is an overall perspective view of the grille support member 3, as viewed from above, diagonally rearward left. FIG. 5C is a cross-sectional view of a scene in FIG. 5A, taken along a line Vc-Vc. Note that directions of front, rear, up, down, right, and left of the grille support member 3 in FIGS. 5A to 5C are matched to those in FIGS. 2 to 4.

The grille support member 3 has a substantially H-shape in a top view, as shown in FIGS. 5A and 5B. That is, the grille support member 3 has a pair of horizontal portions 16, and a coupling portion 17 connecting the horizontal portions 16 with each other. In particular, the horizontal portions 16 are aligned parallel to each other in the vehicle width direction (right-left direction in FIG. 5A) at a predetermined distance, and extend substantially horizontally in the vehicle front-rear direction. The horizontal portions 16 are bilaterally symmetrical to each other. The coupling portion 17 is formed with a plate having an L-shape in cross-section, as indicated by a dotted line in FIG. 5A. The coupling portion 17 couples the horizontal portions 16 with each other at positions away rearward from centers in the vehicle front-rear direction of the horizontal portions 16.

The horizontal portion 16 includes a horizontal body 22 having a U-shape in cross-section, open downward, and an inner edge 23 extending from the horizontal body 22 and having an L-shape in cross-section, as shown in FIG. 5C. The inner edge 23 has an end portion extending from a lower edge of the horizontal body 22 toward the adjacent horizontal portion 16 bent downward in an L-shape, as shown in FIG. 5A. The inner edge 23 extends along the horizontal body 22 and has a rear end thereof aggregated with the coupling portion 17 having an L-shape in cross-section, as shown in FIG. 5A.

The horizontal body 22 having a U-shape in cross-section has a front end thereof closed by a front surface 19 in a plate shape running in the vehicle width direction (right-left direction in FIG. 5A) and in the up-down direction, as shown in FIG. 5A. In addition, the horizontal body 22 has a rear end thereof closed by a rear surface 21, as shown in FIGS. 5A and 5B. The rear surface 21 is formed of an inclining plate gradually dislocated downward toward the rear.

The horizontal portion 16 is provided, at a front thereof, with an upward extension 13, as shown in FIGS. 5A and 5B. The upward extension 13 is formed of a plate rising upward from an upper surface of the horizontal portion 16 at a position slightly offset rearward from the front surface 19. The upward extension 13 ranges from the horizontal body 22 to the inner edge 23, as shown in FIG. 5A.

The upward extension 13 is formed with a screw insertion hole 14, as shown in FIG. 5B. Additionally, the upper extension 13 is provided, on a front surface thereof, with a collar 15 at a position corresponding to the screw insertion hole 14, as shown in FIG. 5A. The collar 15 has a boss 33 (see FIG. 6), formed in the front upper grille 5 (see FIG. 6), fitted thereinto, as described below. In addition, the horizontal portion 16 is formed, at a front thereof, with a reinforcement rib 24 for the upward extension 13, as shown in FIGS. 5A and 5B.

The reinforcement rib 24 is formed of a right-angled triangular plate, as shown in FIG. 5B. The reinforcement rib 24 is positioned at a corner of a rear surface of the upward extension 13 and a top surface of the horizontal body 22, and is formed so as to be aggregated with the upward extension 13 and the horizontal body 22. Further, the horizontal body 22 is formed, in a rear portion thereof, with an engagement hole 22a to engage with the joining pin P (see FIG. 3), as shown in FIGS. 5A and 5B.

Figure 6:
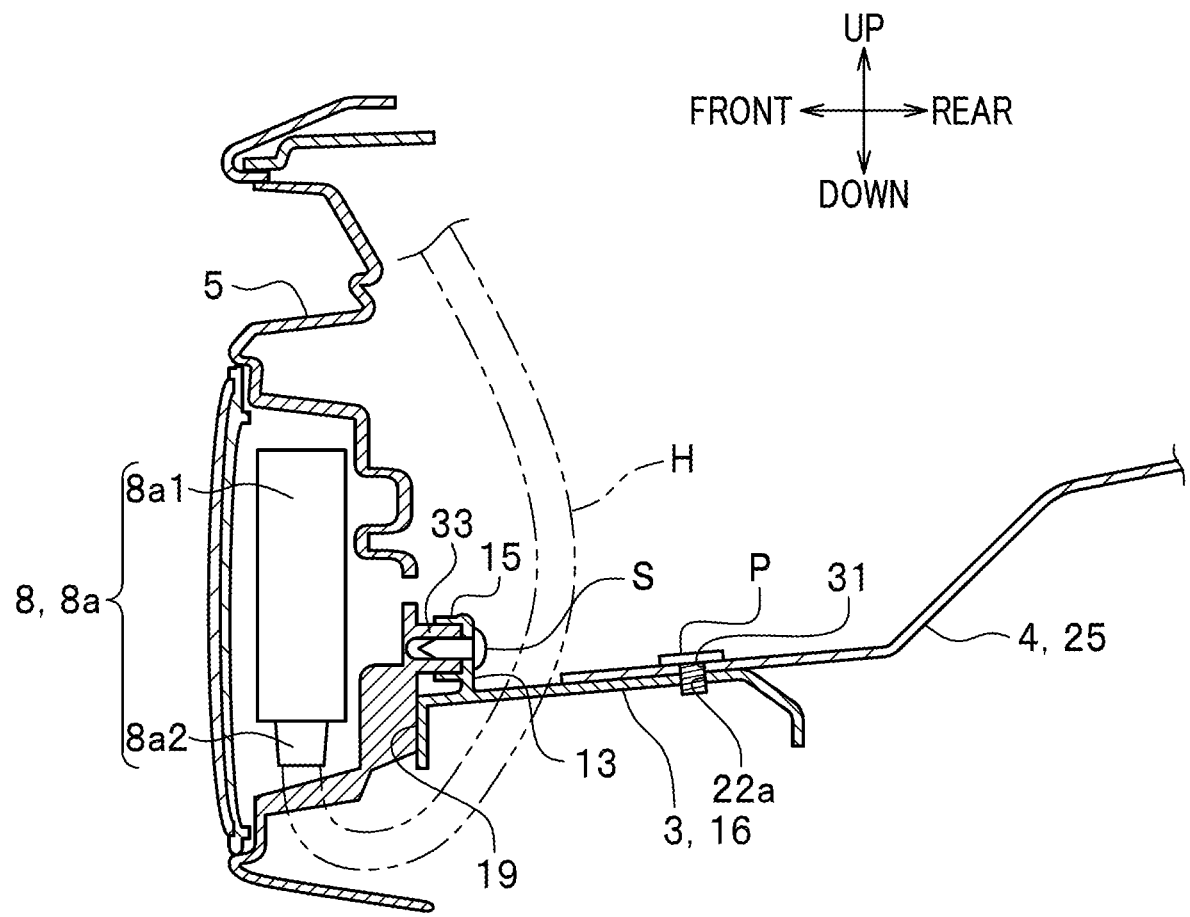
FIG. 6 is a cross-sectional view of a scene in FIG. 3, taken along a line VI-VI.

Next, a description is given of a structure to support the upper front grille 5 by the grille support member 3. The pair of horizontal portions 16 of the grille support member 3 has the upward extensions 13 fixed to the upper front grille 5 at positions in vicinity to right and left sides of the radar 8, as shown in FIG. 3. In particular, the bosses 33 formed in the front upper grille 5 are fitted inside the collars 15 formed in the upward extensions 13, as shown in FIG. 6 of a cross-sectional view of the scene in FIG. 3, taken along a line VI-VI.

The boss 33 is formed with a threaded portion, not shown, to which a screw S inserted into the screw insertion hole 14 (see FIG. 5B) in the upward extension 13 is screwed. This results in the upward extension 13 abutting on, and fixed to, the front upper grille 5 from behind. With the upward extension 13 screwed to the boss 33, the front surface 19 of the horizontal portion 16 abuts on a back surface of the front upper grille 5.

The grille support member 3 attached in this manner to the back surface of the upper front grille 5 is formed to have portions thereof, positioned behind the radar 8, defining a recess 18 between the pair of the horizontal portions 16, as shown in FIG. 3. Incidentally, the radar 8 of the embodiment has the connector 8a2 projecting downward from the radar body 8a1, as shown in FIG. 6. The connector 8a2 has the harness H, extending from above through the recess 18 (see FIG. 3), drawn and connected thereto.

The grille support member 3 indicated by a hidden line (dotted line) in FIG. 3 has a rear end thereof fixed by the joining pings P to the upper air-flow smoother plate 25 of the air guide member 4. In particular, the rear end of the horizontal portion 16 of the grille support member 3 is arranged to overlap with, on the underside of, the upper air-flow smoother plate 25 of the air guide member 4, as shown in FIG. 6.

The joining pin P inserted into the insertion hole 31 of the upper air-flow smoother plate 25 engages with engagement hole 22a of the horizontal portion 16, to have the rear end of the grille support member 3 fixed to the upper air-flow smoother plate 25 of the air guide member 4. Incidentally, the joining pin P of the embodiment is assumed to be a snap lock pin, but may be instead another type of fastener such as a rivet, a bolt, and a screw.

The horizontal portion 16 of the grille support member 3, connecting the upper front grille 5 with the air guide member 4 in this manner, has a U-shape in cross-section, as shown in FIG. 5C, from a portion thereof fixed to the upper front grille 5 to a portion thereof fixed to the air guide member 4.

Advantageous Effects

Hereinbelow, a description is given of advantageous effects of the vehicle front structure 1 according to the embodiment. In general, a front grille provided at a front of a vehicle body tends to bow because of being pushed rearward by onrushing air from forward travel, thermal expansion due to change in ambient temperature, or the like. This results in a vehicle front structure having a radar provided at the front grille sometimes failing to correctly detect by the radar an obstacle in front of the vehicle, due to the front grille bowing.

In contrast, the vehicle front structure 1 of the embodiment has the front end of the grille support member 3, extending in the vehicle front-rear direction substantially horizontally, fixed to the upper front grille 5 (front grille). Additionally, the rear end of the grille support member 3 is fixed to the air guide member 4. According to the vehicle front structure 1 as described above, the grille support member 3 supports the upper front grille 5 from behind so as to prop up bowing rearward due to onrushing air from forward travel or change in ambient temperature. This causes the vehicle front structure 1 to prevent the upper front grille 5 from bowing due to air pressure or change in ambient temperature, to allow correct detection by the radar 8.

In addition, the vehicle front structure 1 has the rear end of the grille support member 3 fixed to the air guide member 4 formed of resin. According to the vehicle front structure 1 as described above, the air guide member 4 is deformed by a load greater than air pressure while the vehicle is traveling, such as a minor collision and a collision with a pedestrian, to allow the vehicle front structure 1 to have a superior performance of absorbing a collision load. That is, according to the vehicle front structure 1 as described above, collision safety performance for a pedestrian is improved and the upper front grille 5 is prevented from deformation due to wind pressure while the vehicle is traveling or change in ambient temperature, as comparted with a conventional one.

Further, the vehicle front structure 1 has the upward extension 13 of the grille support member 3 abutted on from behind, and fixed to, the upper front grille 5 (front grille). According to the vehicle front structure 1 as described above, the upper front grille 5 bowing rearward due to onrushing air from forward travel or change in ambient temperature is tightly supported from behind by the grille support member 3.

Still further, the vehicle front structure 1 has the rear end of the grille support member 3 overlapped in the up-down direction with, and fixed to, the air guide member 4. According to the vehicle front structure 1 as described above, a shearing force is applied between the grille support member 3 and the air guide member 4 when a load greater than air pressure while the vehicle is traveling is inputted from the front, due to a minor collision or a collision with a pedestrian. The shearing force urges components of a fixing portion where the grille support member 3 is fixed to the air guide member 4, such as the joining pin P, the insertion hole 31, and the engagement hole 22a, to be deformed. According to the vehicle front structure 1 as described above, the fixing portion is deformed without the grille support member 3 propping up the inputted collision load. This allows the vehicle front structure 1 to have a superior performance of absorbing a collision load.

Still further, the vehicle front structure 1 has the grille support member 3 fixed to the upper front grille 5 (front grille) at the positions in vicinity to right and left sides of the radar 8. According to the vehicle front structure 1 as described above, the upper front grille 5, elongated in the vehicle width direction, is effectively prevented from bowing due to onrushing air from forward travel or change in ambient temperature.

Still further, the vehicle front structure 1 has the grille support member 3 formed to have the portions thereof positioned behind the radar 8 defining the recess. According to the vehicle front structure 1 as described above, the grille support member 3 allows the harness H to run through the recess to the radar 8.

Still further, the vehicle front structure 1 has the grille support member 3 formed to have the reinforcement rib at the corner of the horizontal body 16 and the upward extension 13. According to the vehicle front structure 1 as described above, the reinforcement rib 24 prevents the upward extension 13 from deformation due to onrushing air from forward travel or change in ambient temperature, to more effectively prevent the upper front grille 5 from bowing.

Still further, the vehicle front structure 1 has the grille support member 3 formed such that the horizontal portion 16 has a cross-section in a U-shape, open downward, from the portion thereof fixed to the upper front grille 5 (front grille) to the portion thereof fixed to the air guide member 4. According to the vehicle front structure 1 as described above, rigidity in the vehicle front-rear direction of the horizontal portion 16 is increased, to further more effectively prevent the upper front grille 5 from bowing due to onrushing air from forward travel or change in ambient temperature.

Still further, the vehicle front structure 1 has the horizontal portion 16 of the grille support member 3 formed with the front surface 19 covering the cross section in a U-shape. The front surface 19 abuts on the upper front grille 5 (front grille). According to the vehicle front structure 1 as described above, the grille support member 3 more tightly supports the upper front grille 5 from behind, to all the more effectively prevent the upper front grille 5 from bowing due to onrushing air from forward travel or change in ambient temperature.

Hereinabove, the embodiment has been described, but the present invention is not limited thereto and can be implemented in various forms. For example, the grille support member 3 of the embodiment has the front end of the horizontal portion 16 fixed to the upper front grille 5 at positions on an outer side in the vehicle width direction of the radar 8. However, the grille support member 3 is not limited to the one having the horizontal portion 16 directly fixed to the upper front grille 5, as described above, and the horizontal portion 16 may be fixed to the radar 8 (support board 8b), to indirectly support the upper front grille 5.

LIST OF REFERENCE SIGNS

1: vehicle front structure, 2: front bumper, 3: grille support member, 4: air guide member, 5: upper front grille (front grille), 8: radar, 11: upper opening, 13: upward extension of grille support member, 16: horizontal portion of grille support member, 19: front surface of grille support member, and 24: reinforcement rib of grille support member.

What is claimed is:

1. A vehicle front structure comprising:
    a front bumper having an opening;
    a front grille attached to the front bumper;
    an air guide member arranged behind the opening of the front bumper to guide rearward ambient air taken through the opening;
    a radar attached to the front grille; and
    a grille support member arranged behind the radar and extending substantially horizontally in a vehicle front-rear direction,
    wherein a front end of the grille support member is fixed to the front grille directly or indirectly via the radar, and
    a rear end of the grille support member is fixed to the air guide member.

2. The vehicle front structure according to claim 1, wherein
    the grille support member includes:
        a horizontal portion extending in the vehicle front-rear direction; and an upward extension extending upward from a front end of the horizontal portion, wherein the upward extension is abutted on from behind, and fixed to, the front grille.

3. The vehicle front structure according to claim 1, wherein a rear end of the grille support member is overlapped in an up-down direction with, and fixed to, the air guide member.

4. The vehicle front structure according to claim 1, wherein the grille support member is fixed to the front grille at positions in vicinity to right and left sides of the radar.

5. The vehicle front structure according to claim 1, wherein the grille support member is formed to have portions thereof, positioned behind the radar, defining a recess.

6. The vehicle front structure according to claim 1, wherein the grille support member includes:

a horizontal portion extending in the vehicle front-rear direction;

an upward extension extending upward from a front end of the horizontal portion; and a reinforcement rib arranged at a corner of the horizontal portion and the upward extension.

7. The vehicle front structure according to claim 1, wherein the grille support member is formed to have a cross-section in a U-shape, open downward, from a portion thereof fixed to the front grille to a portion thereof fixed to the air guide member.

8. The vehicle front structure according to claim 7, wherein the grille support member includes:

a horizontal portion extending in the vehicle front-rear direction;

an upward extension extending upward from a front end of the horizontal portion; and a front surface covering, along a vehicle width direction, the cross-section in a U-shape at a front end of the horizontal portion, wherein the front surface abuts on the front grille.

* * * * *